United States Patent
Erdler

(10) Patent No.: US 10,075,618 B2
(45) Date of Patent: Sep. 11, 2018

(54) SECURITY FEATURE FOR DIGITAL IMAGING

(71) Applicant: SONY CORPORATION, Tokyo (JP)

(72) Inventor: Oliver Erdler, Ostfildern (DE)

(73) Assignee: Sony Corporation, Tokyo (JP)

( * ) Notice: Subject to any disclaimer, the term of this patent is extended or adjusted under 35 U.S.C. 154(b) by 111 days.

(21) Appl. No.: 14/782,751

(22) PCT Filed: Mar. 19, 2014

(86) PCT No.: PCT/EP2014/055501
§ 371 (c)(1),
(2) Date: Oct. 6, 2015

(87) PCT Pub. No.: WO2014/173588
PCT Pub. Date: Oct. 30, 2014

(65) Prior Publication Data
US 2016/0050341 A1 Feb. 18, 2016

(30) Foreign Application Priority Data

Apr. 22, 2013 (EP) .................................. 13164700

(51) Int. Cl.
| | |
|---|---|
| *G06F 21/00* | (2013.01) |
| *H04N 1/44* | (2006.01) |
| *G06F 21/32* | (2013.01) |
| *G06K 9/00* | (2006.01) |
| *H04N 5/232* | (2006.01) |

(52) U.S. Cl.
CPC .......... *H04N 1/4486* (2013.01); *G06F 21/32* (2013.01); *G06K 9/00288* (2013.01); *H04N 1/444* (2013.01); *H04N 1/4446* (2013.01); *H04N 1/4493* (2013.01); *H04N 5/23216* (2013.01); *H04N 5/23219* (2013.01); *H04N 2201/3253* (2013.01)

(58) Field of Classification Search
CPC ..................................................... G06F 21/32
See application file for complete search history.

(56) References Cited

U.S. PATENT DOCUMENTS

| | | | |
|---|---|---|---|
| 5,862,217 A | 1/1999 | Steinberg et al. | |
| 6,839,844 B1 * | 1/2005 | Okano .................... | G09C 5/00 380/246 |

(Continued)

FOREIGN PATENT DOCUMENTS

| | | |
|---|---|---|
| EP | 2 043 293 A1 | 4/2009 |
| EP | 2 164 056 A2 | 3/2010 |

(Continued)

OTHER PUBLICATIONS

J.M. Rodrigues, et al. "Face Protection by Fast Selective Encryption in a Video", LIRMM Laboratory, UMR CNRS 5506, University of Montpellier, 2006, 6 pages.

(Continued)

*Primary Examiner* — Ali Shayanfar
(74) *Attorney, Agent, or Firm* — Xsensus, LLP

(57) ABSTRACT

A method including: providing an image; encrypting an encryption region of the image, the encryption region is less than the whole region of the image; keeping a remaining region of the image unencrypted to provide a partially encrypted image; and storing the partially encrypted image.

16 Claims, 2 Drawing Sheets

(56) References Cited

U.S. PATENT DOCUMENTS

| | | | |
|---|---|---|---|
| 6,907,135 B2* | 6/2005 | Gifford | G06F 21/32 382/116 |
| 7,356,143 B2* | 4/2008 | Morten | G06F 21/10 380/201 |
| 7,792,295 B2* | 9/2010 | Yokota | H04N 7/18 380/210 |
| 8,588,414 B2* | 11/2013 | Ishii | G09C 5/00 380/243 |
| 2004/0001220 A1 | 1/2004 | Gorday et al. | |
| 2005/0002585 A1* | 1/2005 | Brauckmann | H04N 7/1675 382/254 |
| 2005/0232502 A1 | 10/2005 | Fukushima et al. | |
| 2007/0008570 A1* | 1/2007 | Okamoto | H04N 1/00278 358/1.14 |
| 2007/0286496 A1* | 12/2007 | Matsuzaki | H04N 1/00204 382/209 |
| 2007/0296817 A1 | 12/2007 | Ebrahimi et al. | |
| 2008/0207165 A1 | 8/2008 | Eckhart | |
| 2008/0267403 A1* | 10/2008 | Boult | H04L 9/0894 380/255 |
| 2008/0298596 A1* | 12/2008 | Kuraki | G09C 5/00 380/283 |
| 2009/0016645 A1 | 1/2009 | Sako et al. | |
| 2009/0116643 A1* | 5/2009 | Hatano | H04N 1/4486 380/59 |
| 2009/0220076 A1* | 9/2009 | Kuraki | H04N 1/44 380/54 |
| 2009/0262927 A1* | 10/2009 | Hinaga | H04L 9/0891 380/45 |
| 2009/0310819 A1* | 12/2009 | Hatano | G06F 21/6245 382/100 |
| 2009/0319789 A1* | 12/2009 | Wilson | H04L 9/12 713/168 |
| 2010/0023781 A1* | 1/2010 | Nakamoto | H04L 9/08 713/193 |
| 2010/0091337 A1* | 4/2010 | Yoshio | H04N 1/44 358/3.28 |
| 2011/0125998 A1* | 5/2011 | Jeon | H04L 63/0428 713/150 |
| 2011/0150327 A1* | 6/2011 | Yoo | G06T 1/00 382/165 |
| 2011/0158470 A1* | 6/2011 | Martin | H04N 19/647 382/100 |
| 2012/0121082 A1 | 5/2012 | Choi et al. | |
| 2013/0100502 A1* | 4/2013 | Takahashi | H04N 1/3871 358/3.28 |
| 2013/0251143 A1* | 9/2013 | Nakagata | H04L 9/28 380/28 |
| 2013/0340028 A1* | 12/2013 | Rajagopal | H04L 63/08 726/1 |
| 2014/0185804 A1* | 7/2014 | Jung | H04N 7/1675 380/236 |
| 2016/0050341 A1* | 2/2016 | Erdler | H04N 1/444 380/245 |

FOREIGN PATENT DOCUMENTS

| | | |
|---|---|---|
| JP | 2002-135782 A | 5/2002 |
| WO | 2006/006081 A2 | 1/2006 |

OTHER PUBLICATIONS

International Search Report and Written Opinion dated May 16, 2014 for PCT/EP2014/055501 filed on Mar. 19, 2014.

* cited by examiner

SECURITY FEATURE FOR DIGITAL IMAGING

CROSS-REFERENCE TO RELATED APPLICATIONS

The present application is based on PCT filing PCT/EP2014/055501 filed Mar. 19, 2014, and claims priority to European Patent Application EP 13164700.0, filed in the European Patent Office on Apr. 22, 2013, the entire contents of each of which being incorporated herein by reference.

BACKGROUND

Field of the Disclosure

The present disclosure relates to a method for processing a digital image as to provide the image with a security feature. The present disclosure also relates to a method for removing the security feature and a multimedia device adapted to carry out the method.

Description of Related Art

More and more cloud-based applications are offered nowadays and used for storing and sharing private information, like digital images or videos, e.g. in social networks, online platforms for images or the like. For example, it is very popular particularly for young people to capture images/videos and to upload these images/videos to a social network as to share these images/videos with friends. As a consequence of this popularity, respective applications are integrated into multimedia devices, like smartphones, so that the upload of data becomes more and more simple and instant. For example, images captured by a smartphone can be directly uploaded to a cloud-based storage/social network.

However, when for example young people or children use such platforms with direct upload from a camera or smartphone, the usage may be unreflected, meaning that they do not really consider the consequences of sharing private information. There is no security feature built in to protect the privacy of the user.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

SUMMARY

It is an object to provide a method which allows to incorporate a security feature as to protect privacy in social networks, cloud-based storages, etc. It is a further object to provide a method for removing such a security feature. It is a further object to provide a multimedia device adapted to carry out such a method and to provide a corresponding computer program for implementing the method and a non-transitory computer-readable recording medium for implementing the method.

According to an aspect there is provided a method comprising
providing an image,
encrypting a region, encryption region, of said image, said encryption region is less than the whole region of the image,
keeping a remaining region of said image unencrypted as to provide a partially encrypted image, and
storing said partially encrypted image.

Here it is to be noted that in the context of the present disclosure, the term "image" means still images provided by a camera and moving images provided by a video device for example.

According to a further aspect there is provided a method comprising
receiving a partially encrypted image, said image contains an encrypted region,
determining said encrypted region within said image,
decrypting said region,
replacing said encrypted region with the decrypted region, and
providing a decrypted image.

According to a further aspect there is provided a multimedia device comprising
an image capturing unit adapted to capture and provide an image,
region selection unit adapted to select an encryption region of said image, and
an encrypting unit adapted to encrypt said selected encryption region and to keep the remaining region of said image unencrypted as to provide a partially encrypted image.

According to still further aspects a computer program comprising program means for causing a computer to carry out the steps of the method disclosed herein, and a non-transitory computer-readable recording medium that stores therein a computer program which, when executed by a processor, causes the method disclosed herein to be performed are provided.

Preferred embodiments are defined in the dependent claims. It shall be understood that the claimed multimedia device, the claimed computer program and the claimed computer-readable recording medium have similar and/or identical preferred embodiments as the claimed method and as defined in the dependent claims.

One of the aspects of the present disclosure is to automatically provide the captured image with a security feature in form of an encrypted region of the image. In other words, the image is partially encrypted before it is uploaded for example to a social network or cloud storage. The region to be encrypted may for example be automatically determined, for example by a face recognition process, or may be determined/selected manually by the user, for example on an image-to-image basis or in form of a preset region. The password necessary for decrypting the image is sent to the desired person individually.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
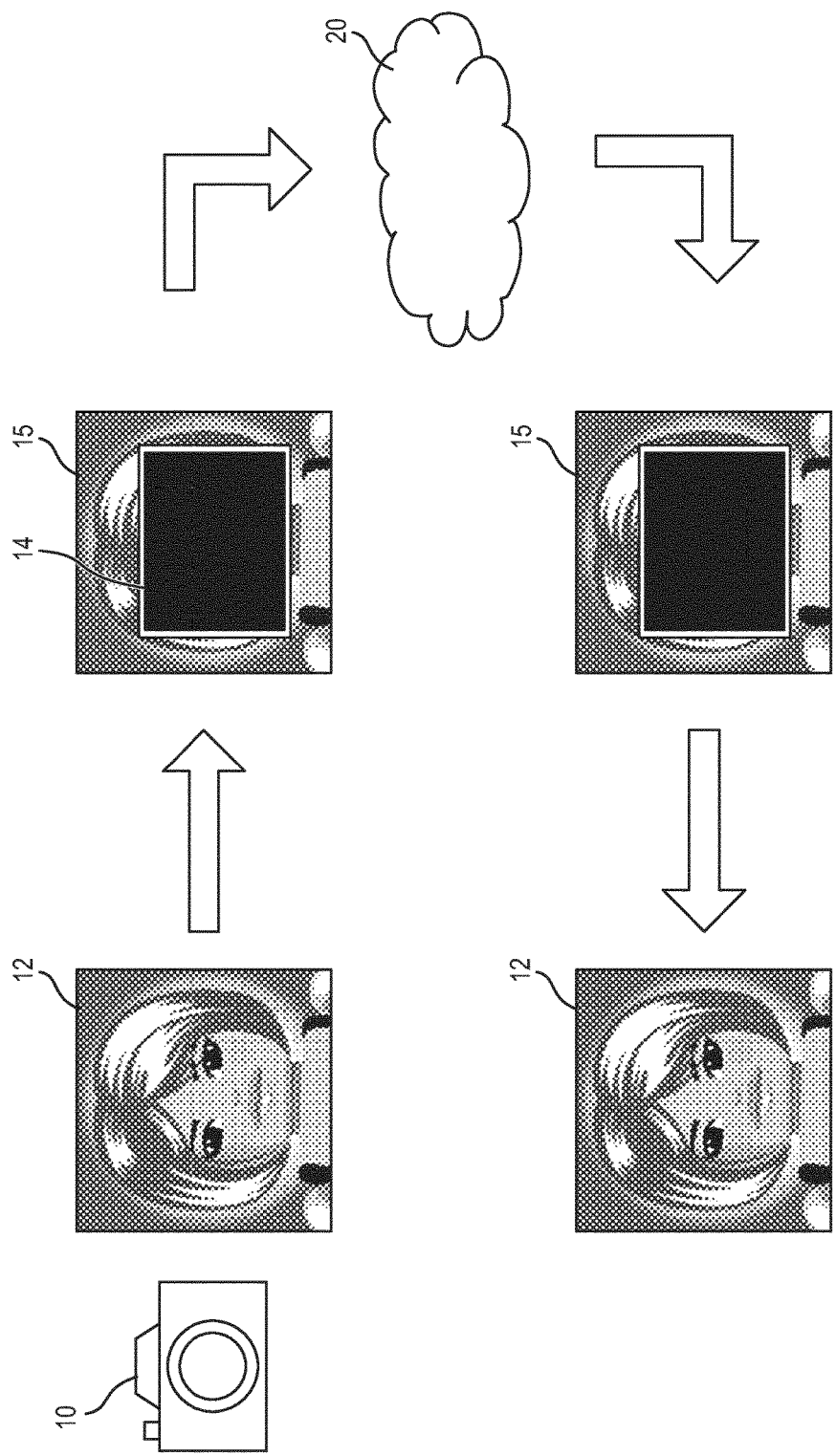
FIG. 1 shows a block diagram for illustrating the method.

Referring now to the drawings, wherein like reference numerals designate identical or corresponding parts throughout the several views, FIG. 1 shows in an illustrative manner some of the steps carried out by an embodiment of the present disclosure. Generally, the embodiment described herein realizes a security mechanism for protecting a user's privacy upon storing captured images or videos. In particular, the embodiment allows to protect private content in an image which is of particular advantage in cases where images are stored in spaces outside of the user's sphere of influence, for example cloud storages. The protection of private content in an image is preferably realized by encryption techniques so that only authorized persons are able to decrypt and hence see the respective private content within the image.

Referring back to FIG. 1, the illustrated example shows a multimedia device 10, preferably a camera or smartphone. The user can capture an image 12 which contains private or personal information, here the face of a third person. If the user stores this image 12 in a social network or a cloud storage 20, the image is out of the user's reach and hence the user does not really know who has access to this image and hence to the private content. Therefore, as shown in FIG. 1, the present embodiment gives the user the possibility to protect a region of interest which is indicated by reference numeral 14 and shown as a black box. This region of interest 14 is preferably encrypted with the result that the captured image 12 is partially encrypted. The partially encrypted image which is indicated with reference numeral 15 is then stored for example in the cloud storage 20.

As a result, the partially encrypted image 15 still contains private information in the region of interest 14, however, it is protected against access through any unauthorized person. Only those persons having the authorization by the user, for example in form of an decryption key (password) are able to remove the protection as to see the original content of the region of interest.

As shown in the lower half of the diagram of FIG. 1, a person can download the partially encrypted image 15 from the cloud storage and can then remove the protection, for example by using a password given directly by the user or owner of the image, to regain the original image 12.

Figure 2:
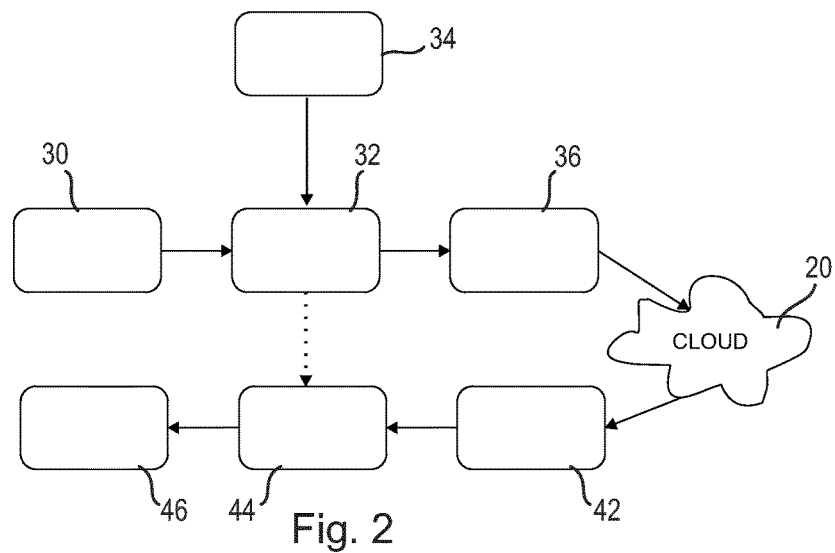
FIG. 2 shows a block diagram of the method.

Referring to FIG. 2, the respective method or program run by the multimedia device 10 is now described.

In a first step 30, a picture or image is taken by the multimedia device 10, preferably a camera or smartphone. In the next step 32, a region of interest with in the image is encrypted by using a predetermined encryption algorithm. For example, a password based encryption can be carried out.

The region of interest 14 is determined or selected in a separate step 34. For example, the region of interest may be determined/selected manually by the user. As an alternative, the region of interest could also be a fixed predetermined region or may be determined by a specific algorithm which allows to find private information in the image. Such private information could be a face of a person, license plates on cars or for example street names. For the first example, well-known face recognition algorithms could be used to detect a face or faces within the image. The detected region is then selected as region of interest for the encryption step 32.

It is to be noted that the region of interest is not necessarily a continuous area within the image. In other words, the region of interest could comprise several separate areas within the image.

The region of interest is encrypted whereas the remaining region of the image is kept unencrypted. This partially encrypted image 15 is supplemented by further data like type of encryption, size of region of interest, position of this region, etc. and is then stored internally in the multimedia device or uploaded to a cloud-based platform. This storing or uploading step is designated with reference numeral 36.

With storing or uploading of the partially encrypted image 15, the first part of the method is completed. This first part is carried out in the multimedia device 10, preferably automatically after taking a picture. This only requires that the settings comprise information about the encryption algorithm to be used, the password and the address of the cloud-based platform.

The second part of the method shown in FIG. 2 addresses the decryption and display of the image which can be carried out by any multimedia device, for example a personal computer, or the multimedia device 10 as well. Hence, the second part of the method is not necessarily run by the same multimedia device as used for the first part of the method.

In step 42, the partially decrypted image is downloaded from the cloud-based platform or retrieved from any other storage. Then, the region of interest which has been encrypted is detected and afterwards decrypted by using the respective key or password. For example, the information about the location and size of the region of interest within the image is contained in the image (preferably within the metadata of the image) so that the decryption algorithm can be applied only to this specific region of interest (step 44). Then, the unencrypted image area and the decrypted region of interest are merged and the original image 12 is displayed in step 46.

Although several encryption algorithms can be used for encrypting the region of interest, it is preferred to use steganography methods because such methods allow to hide the content of the region of interest for example in the unencrypted part of the image. This keeps the image self-contained.

For decryption purposes, it is necessary to know which kind of encryption algorithm was used. This information is contained in the image, for example, also as metadata.

In a further embodiment, the multimedia device 10 could comprise a fingerprint unit or a visual user identification unit which supply unique user identification information. This unique information can be used as a key or password for the encryption step 32 provided that the partially decrypted image 15 is stored locally and/or is decrypted by the same user. Alternatively, the key/password used by the encryption algorithm and generated by a fingerprint unit is given to the person who should have the permission to see the original image.

Figure 3:
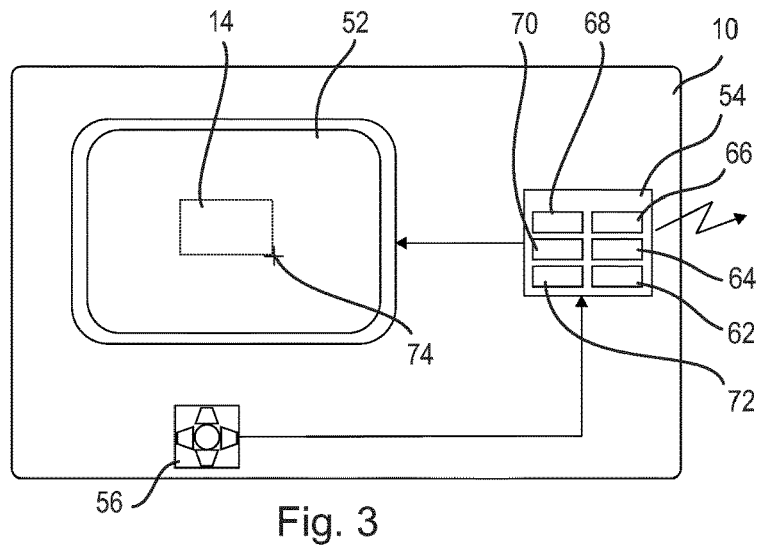
FIG. 3 shows a block diagram of a multimedia device adapted to carry out the method.

In FIG. 3, a multimedia device 10, preferably a smartphone or camera is shown as block diagram with those components affected by the method described above. The multimedia device 10 comprises a display 52 and a processing unit 54, for example a microprocessor circuit. Further, the multimedia device 10 comprises input means 56 which allows to move a cursor on the display 52 in two dimensions. The processing unit 54 comprises an encryption unit 62, a face recognition unit 64, a transmitting unit 66, a user authentification unit 68, a GPS unit 70 and a storage unit 72. It is to be noted here that further units could also be provided if required by the method.

The input means 56 allows the user to mark a region of interest 14 on the display 52 for example by moving a cursor 74. Of course a touch display or another natural user interface, e.g. a camera device with gesture recognition can be used to identify regions either by surrounding them our by selecting a pre-segmented image in an half-automatic way. This would overlap the face detection based approach where the user could tip on faces which should be encrypted. After having selected the region of interest 14, the respective part of the image displayed by the display 52 is encrypted by the encryption unit 62. After completion of the encryption, the partially encrypted image is transmitted via the transmitting unit 66, for example, via wireless LAN, to a cloud-based platform, for example a cloud storage 20.

As an alternative to the manual selection of the region of interest, it is also possible—as already mentioned before—that the face recognition unit scans the image as to detect faces in general or a predetermined face in particular. For example it is possible that several faces are stored in the storage unit 72 by the user. This allows that only specific faces, for example the faces of the children, are protected. In this case if the face recognition unit 64 recognizes a stored face, the respective area is selected as region of interest.

It is also possible that the region of interest is a predetermined region, for example a center region having a predetermined size.

With respect to the encryption unit 62, one or more different encryption algorithms could be implemented so that in a preferred embodiment the user can select one of several different encryption algorithms.

In a further preferred embodiment, the step of encrypting the region of interest could be coupled with a geographic position supplied by the GPS unit. For example this allows the user to specify and store a geographic region, for example the home region, so that an encryption of the image is done if this image has been captured within the specified geographic home region.

Figure 4:
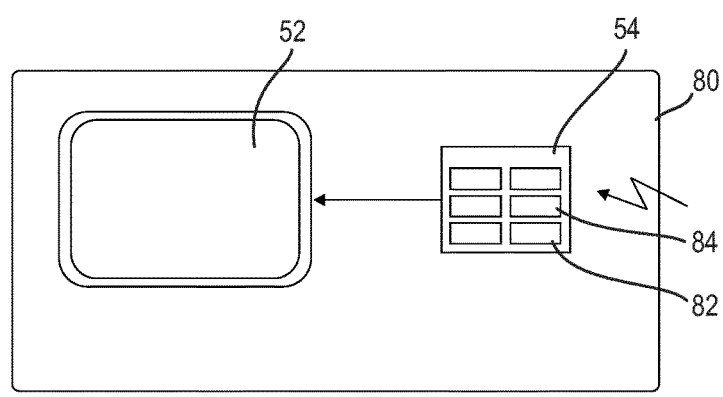
FIG. 4 shows a device for decrypting a partially encrypted image.

In FIG. 4, a device for decrypting and displaying an image is shown and indicated with reference numeral 80. This device 80 could be a personal computer, a laptop, a tablet PC, a smartphone or the like. The device 80 comprises a display 52 as well as a processing unit 54, which at least comprises a decryption unit 82 and a receiving unit 84.

The receiving unit 84 is adapted to receive the partially encrypted image 15 for example via a download from a cloud-based platform. The decrypting unit 82 extracts information concerning the used encrypting algorithm and the location of the region of interest from the image, preferably from the metadata, and runs a decrypting algorithm on the basis of this information. Then the decrypted region and the unencrypted remaining region of the image are merged as to regain the original image 12. This original image 12 is then displayed on the display 52.

As mentioned before, both the encryption and storing/uploading to a cloud-based platform and the downloading and decryption of an image can be carried out on the fly, that is instantaneously after taking a picture or downloading the picture/image.

One of the advantages of the present disclosure is that the user does not have to rely on the available account based security mechanisms from online platforms to protect the privacy, but the present disclosure offers an option for an additional mechanism which is owned by the user The encryption can be done on the fly before uploading the picture or video content to a cloud-based application and it could be integrated to a client application so that the operation is seamless for each user.

Obviously, numerous modifications and variations of the present disclosure are possible in light of the above teachings. It is therefore to be understood that within the scope of the appended claims, the invention may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present invention. Further, such a software may also be distributed in other forms, such as via the Internet or other wired or wireless telecommunication systems.

A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

The invention claimed is:

1. A method performed by a multimedia device, the method comprising:
   capturing an image by a camera of the multimedia device;
   encrypting an encryption region of the image, the encryption region being less than the whole region of the image;
   maintaining a remaining region of the image unencrypted to provide a partially encrypted image;
   adding information indicating an encryption technique used to encrypt the encryption region to the partially encrypted image;
   storing the partially encrypted image;
   transmitting the partially encrypted image to a server; and
   discarding the image captured by the camera of the multimedia device,
   wherein, in the encrypting, a password is activated by a user authentication, and
   wherein the user authentication comprises at least one of a finger scan, a face recognition, pin code input, and a graphical pattern input via a touch display.

2. The method of claim 1, further comprising:
   storing the partially encrypted image at the server.

3. The method of claim 1, wherein the encryption region is selected by a system.

4. The method of claim 3, wherein the face recognition process comprises comparing the face recognized in the image with a set of faces predefined by the user or selected by the user.

5. The method of claim 1, wherein the encryption region is determined by a face recognition process so that the encryption region covers a face recognized in the image.

6. The method of claim 1, wherein encrypting the encryption region comprises applying a steganography technique on the encryption region.

7. The method of claim 1, comprising:
determining a geographic position of the multimedia device; and
encrypting the encryption region if the geographic position is within a predetermined range.

8. The method of claim 1, wherein encrypting the encryption region uses the password.

9. The method of claim 1, wherein the added information includes a size of encryption region and a position of encryption region within the image.

10. A multimedia device comprising:
a camera configured to capture an image;
circuitry configured to
select an encryption region of the image, the encryption region being less than the whole region of the image; and
encrypt the selected encryption region while keeping a remaining region of the image unencrypted to provide a partially encrypted image;
add information indicating an encryption technique used to encrypt the encryption region to the partially encrypted image;
store the partially encrypted image; and
discard the image captured by the camera of the multimedia device; and
a communication interface configured to transmit the partially encrypted image to a server,
wherein, in the encrypting, a password is activated by a user authentication, and
wherein the user authentication comprises at least one of a finger scan, a face recognition, pin code input, and a graphical pattern input via a touch display.

11. The multimedia device of claim 10, further comprising:
a user interface configured to receive an input selecting the encryption region.

12. The multimedia device of claim 10, wherein the communication interface is further configured to transmit the partially encrypted image to at least one of a cloud storage, a memory card, and an internal device memory.

13. The multimedia device of claim 10, wherein the circuitry is configured to recognize a face in the image and select a region of the image including the recognized face as the encryption region.

14. The multimedia device of claim 13, wherein the circuitry is configured to compare a recognized face with a set of predetermined faces stored in a memory.

15. The multimedia device of claim 10, wherein the circuitry is configured to confirm the user's identity.

16. The multimedia device of claim 10, wherein the multimedia device is one of a mobile phone, a digital camera, a digital video camera, a tablet computer, a laptop computer, a personal computer, a TV set.

* * * * *